June 15, 1937. K. K. LEDIG 2,084,000
PEN POINT
Original Filed Dec. 21, 1935
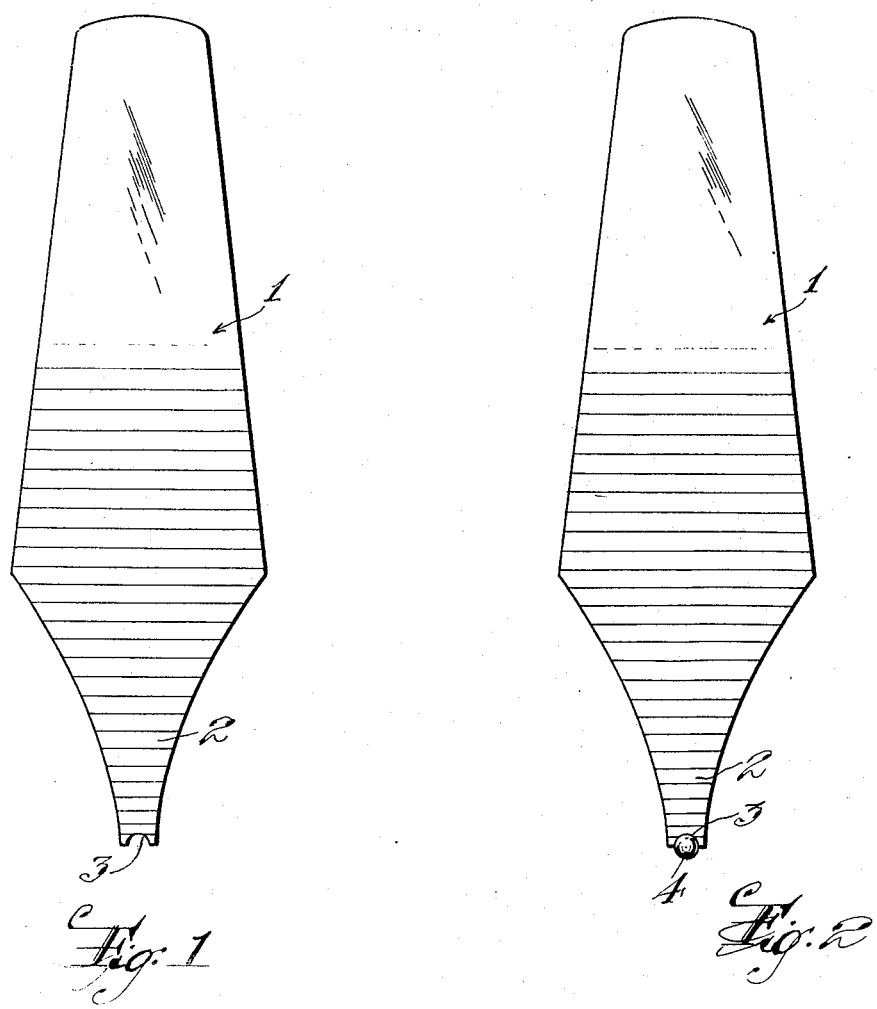
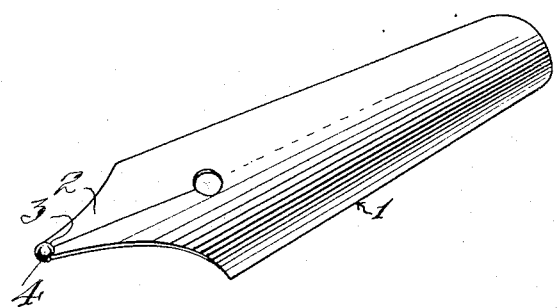
INVENTOR
Kurt K. Ledig
BY
Fred C. Fischer
ATTORNEY Patented June 15, 1937

2,084,000

UNITED STATES PATENT OFFICE 2,084,000

PEN POINT

Kurt K. Ledig, Newark, N. J., assignor to American Platinum Works, Newark, N. J., a corporation of New Jersey Original application December 21, 1935, Serial No. 55,541. Patent No. 2,080,140, dated May 11, 1937. Divided and this application July 1, 1936, Serial No. 88,366

1 Claim. (Cl. 120—109)

This invention relates to improvements in pen points. This application is a division of my co-pending application Serial No. 55,541, filed December 21, 1935.

In the manufacture of pen points in which iridium tips, or tips of other similar metals, are attached to pen nibs, it has been found advantageous to cause this attaching by electrical means, such as electrical welding. Inasmuch as the iridium tip is relatively small, considerable difficulty has been experienced in properly centering the tip relative to the nib, resulting in a large number of the completed pen points being rejected as imperfect.

It is an object of this invention to provide a pen point having a nib provided with means by which the centering of a tip on the nib is assured. In accordance with my invention the nib is provided with a recess in one end thereof, which recess is centrally located and receives the nib during the attaching process to maintain the nib in proper position, so that the completed pen point has the tip accurately located in the center of the nib.

A further object of this invention is the provision of a pen point which can be manufactured more readily and more accurately than has heretofore been the case, and which is provided with means which overcomes the necessity for a large number of rejections due to improperly located tips on pen nibs.

These and other advantageous objects, which will later appear are accomplished by the simple and practical construction and arrangement of parts hereinafter described and exhibited in the accompanying drawing, forming part hereof, and in which:

Fig. 1 is a plan view of a blank for forming a pen nib embodying my invention,

Fig. 2 is a plan view of a blank embodying my invention having a tip attached thereto, and Fig. 3 is a perspective view of a pen point embodying my invention.

Referring to the drawing, in Fig. 1 there is shown a blank 1 for forming a pen nib. The blank has a reduced portion 2, the free end of which is provided with a recess 3 preferably centrally positioned with respect to the lower edge of the reduced portion 2.

In Fig. 2 is shown the blank 1 having a tip 4 positioned in the recess. The tip may be made of iridium or a similar metal, and is attached to the nib by means of electric welding or other suitable expedients.

In Fig. 3 is shown a completed pen point with a tip 4 attached thereto, and properly centered due to the recess 3 formed in one end of the pen nib.

By providing the recess 3 in the pen nib, the tip 4 is accurately centered and is maintained in such a position during the attaching of the tip to the nib, so that when the pen point is completed there is no cause for rejecting the pen point because of improperly located tips.

It is obvious that the expedient of providing a recess in the pen nib for centering the tip, facilitates the manufacture of pen points and also enables the production of more effective and accurate pen points.

The foregoing disclosure is to be regarded as descriptive and illustrative only, and not as restrictive or limitative of the invention, of which obviously embodiments may be constructed including many modifications, without departing from the general scope herein indicated and denoted in the appended claim.

Having thus described my invention, what I claim as new and desire to secure by Letters Patent, is:

In the manufacture of a pen point, a blank for forming a pen nib, said blank having a recess in one end thereof, said recess extending entirely through the blank from one side to the other.

KURT K. LEDIG.